Feb. 12, 1963 J. H. WARD 3,077,049
DETACHABLE MOUNT FOR FISHING LINE WEIGHTS
Filed June 23, 1960
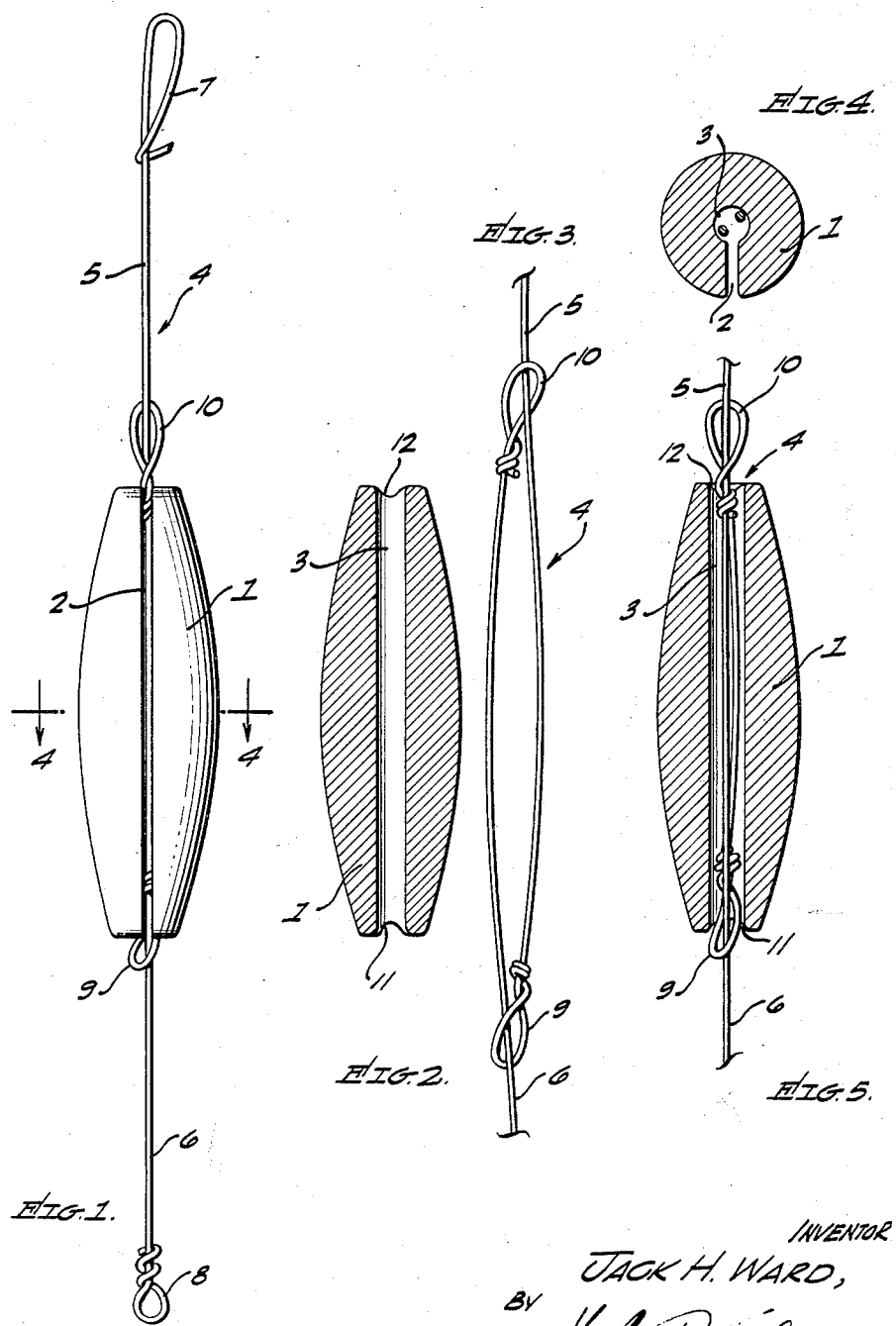
INVENTOR
JACK H. WARD,
BY
ATTORNEY.

United States Patent Office 3,077,049
Patented Feb. 12, 1963

3,077,049
DETACHABLE MOUNT FOR FISHING LINE
WEIGHTS
Jack H. Ward, 2916 E. Anaheim, Long Beach, Calif.
Filed June 23, 1960, Ser. No. 38,262
2 Claims. (Cl. 43—44.9)

This invention relates to a detachable mount for fishing line weights whereby a metallic sinker can be secured or removed from the fishing line as desired.

An object of my invention is to provide a novel detachable mount for the metallic weights secured to fishing lines whereby the weight can be quickly and easily secured to the line by means of a slidable fastener mounted in the fishing line.

Another object of my invention is to provide a novel detachable mount of the character stated in which the sinker is provided with a longitudinal groove to receive a wire segment, the wire being formed with stops or loops thereon to engage the sinker and hold that sinker securely in position.

Another object of my invention is to provide a novel detachable mount of the character stated which is simple in construction, inexpensive to manufacture, and which can be easily manipulated to mount or detach the sinker when required.

Other objects, advantages and features of invention may appear from the accompanying drawing, the subjoined detailed description and the appended claims.

In the drawing:

FIGURE 1 is a side elevation of my detachable mount with the sinker secured to the mount.

FIGURE 2 is a longitudinal sectional view of a grooved type of metallic sinker.

FIGURE 3 is a fragmentary side view of my detachable mount showing the parts in releasing position.

FIGURE 4 is a sectional view taken on line 4—4 of FIG. 1.

FIGURE 5 is a longitudinal sectional view of a metallic sinker mounted on the detachable mount.

Referring more particularly to the drawing, the numeral 1 indicates an elongated metallic sinker which is formed with a groove 2 therein; the groove 2 extending into a longitudinal bore 3. Weights of this type are mounted on a fishing line for the purpose of carrying the bait to the bottom of the lake or stream, and these weights must be replaced with different sizes from time to time, depending upon the depth to which the line may be carried. To permit the sinker to be quickly and easily removed and another one attached to the fishing line, I provide a detachable mount 4 which consists of two interlocking sections of wire 5 and 6. The wire segment 5 is provided with a loop or latch portion 7 to which one section of the line is secured. The segment 6 is similarly secured with a loop 8 to which the lead or another section of the fishing line is attached. The segments 5 and 6 are slidably interconnected in the following manner: The segment 5 is formed with a loop 9 which encircles the segment 6 and may slide thereon, substantially as shown. The segment 6 is similarly formed with a loop 10 which encircles the segment 5 of the wire and is slidable thereon. Thus by pulling outwardly on both of the segments 5 and 6 the loops 9 and 10 are pulled towards each other until these loops engage each end of the sinker 1 and are pulled tightly into the bore 3 of the sinker; thus securely holding the sinker in position on the mount as shown in FIGURE 1. To further frictionally hold the loops 9 and 10 in position the sinker 1 may be provided with a notch or groove 11 and 12 at each end thereof, which serve as a seat to receive the loops 9 and 10 respectively.

*In Operation*

The loops 9 and 10 are moved apart by pushing inwardly on the wire segments 5 and 6. The middle portion of the detachable mount 4 is now inserted through the groove 2 and into the bore 3 of the sinker 1. The segments 5 and 6 are now pulled outwardly, causing the loops 9 and 10 to move against the outer ends of the sinker 1, as shown in FIGS. 1 and 5. The loops 9 and 10 will frictionally engage each end of the sinker 1 and will fit into the recesses 11 and 12, thus holding the sinker securely on the mount. The normal longitudinal pull on the fishing line will also tend to hold the loops 9 and 10 in their engaging position, with the ends of the sinker 1 thus tending to retain the sinker in position. By pushing the segments 5 and 6 inwardly the loops 9 and 10 can be disengaged from the ends of the sinker 1, thus permitting its removal and replacement with a different weight if desired.

Having described my invention, I claim:

1. The combination of a fishing line weight and mount therefor, said weight having a groove extending longitudinally therethrough, and said mount including a first metallic wire segment, a second metallic wire segment, an integral loop on the first wire segment encircling the second wire segment, an integral loop on the second wire segment encircling the first wire segment, said loops being slidable on the respective segments, said wire segments extending through said groove and said loops engaging the ends of the weight in the mounted position of the weight.

2. The combination of a fishing line weight and mount therefor, said weight having a groove extending longitudinally therethrough, and a transversely extending notch in each end thereof, and said mount including a first metallic wire segment, a second metallic wire segment, an integral loop on the first wire segment encircling the second wire segment and slidable thereon, an integral loop on the second wire segment encircling the first wire segment and slidable thereon, said wire segments fitting in said groove and each of said loops bearing against an end of the weight when said weight is mounted on said wire segments.

References Cited in the file of this patent

UNITED STATES PATENTS

| 879,941 | Botkin | Feb. 25, 1908 |
| 1,915,876 | Wallace | June 27, 1933 |
| 2,476,088 | Gleason | July 12, 1949 |
| 2,570,293 | Vadnais | Oct. 9, 1951 |
| 2,602,257 | Morgan | July 8, 1952 |
| 2,695,587 | Welter | Nov. 30, 1954 |

FOREIGN PATENTS

| 570,769 | Canada | Feb. 17, 1959 |